US011423498B2

(12) United States Patent
Kraemer et al.

(10) Patent No.: US 11,423,498 B2
(45) Date of Patent: Aug. 23, 2022

(54) MULTIMEDIA CONTENT PLAYER WITH DIGITAL RIGHTS MANAGEMENT WHILE MAINTAINING PRIVACY OF USERS

(71) Applicant: International Business Machines Corporation, Armonk, NY (US)

(72) Inventors: James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 14/970,966

(22) Filed: Dec. 16, 2015

(65) Prior Publication Data
US 2017/0178263 A1 Jun. 22, 2017

(51) Int. Cl.
*G06Q 50/18* (2012.01)
*G06Q 20/12* (2012.01)
*G06Q 20/06* (2012.01)

(52) U.S. Cl.
CPC ......... *G06Q 50/184* (2013.01); *G06Q 20/065* (2013.01); *G06Q 20/1235* (2013.01)

(58) Field of Classification Search
None
See application file for complete search history.

(56) References Cited

U.S. PATENT DOCUMENTS

| 6,047,242 A | 4/2000 | Benson |
| 6,850,252 B1 | 2/2005 | Hoffberg |

(Continued)

FOREIGN PATENT DOCUMENTS

| CN | 1894923 | 1/2007 |
| CN | 103339957 | 10/2013 |

(Continued)

OTHER PUBLICATIONS

Poorvi Vora et. al., "Privacy and Digital Rights Management", 2001 (Year: 2001).*

(Continued)

*Primary Examiner* — Jacob C. Coppola
*Assistant Examiner* — Timothy Paul Sax
(74) *Attorney, Agent, or Firm* — Fleit Intellectual Property Law; Jon Gibbons

(57) ABSTRACT

A system, method, and computer readable storage medium configured for delivering services from a server to ensure multimedia content control by content providers (i.e. reduce piracy) and to ensure privacy by content users is described. The method begins with executing at least a portion of a content media player application to the device using a zero-knowledge protocol to ensure privacy of the user. Examples of zero-knowledge verifiable computing are succinct computational integrity and privacy (SCIP) protocol, zero-knowledge succinct non-interactive argument of knowledge (zk-snark) protocol, and probabilistically checkable proof (PCP) protocol. The content media player application includes digital right management technology using zero-knowledge verifiable computing to enforce usage conditions on the multimedia content. A response is received from the user device that the content media player application has executed on the user device. Based upon the response indicating a successful execution, accessing the multimedia content by the content media player application.

19 Claims, 6 Drawing Sheets

(56) References Cited

U.S. PATENT DOCUMENTS

| | | | |
|---|---|---|---|
| 9,129,095 B1 | 9/2015 | Lam et al. | |
| 2009/0175442 A1* | 7/2009 | Feng | H04L 9/3257 380/28 |
| 2012/0089494 A1* | 4/2012 | Danezis | H04L 9/3218 705/40 |
| 2012/0173877 A1 | 7/2012 | Pendakur et al. | |
| 2012/0233036 A1 | 9/2012 | Mirashrafi et al. | |
| 2014/0047544 A1 | 2/2014 | Jakobsson | |
| 2014/0172633 A1* | 6/2014 | Dogin | G06Q 50/01 705/26.8 |
| 2014/0351582 A1* | 11/2014 | Barletta | H04L 9/3226 713/159 |
| 2018/0083780 A1* | 3/2018 | Alesiani | G06F 17/16 |

FOREIGN PATENT DOCUMENTS

| | | |
|---|---|---|
| CN | 103559454 | 2/2014 |
| JP | 2007157021 | 6/2007 |
| JP | 2014523164 | 9/2014 |
| JP | 2015531096 | 10/2015 |
| WO | 2008053471 | 5/2008 |
| WO | 2015024129 | 2/2015 |
| WO | 2015144971 | 10/2015 |

OTHER PUBLICATIONS

J. Christopher Bare, "Attestation and Trusted Computing", Mar. 2006 (Year: 2006).*

Examination Report Under Section 18(3) for Application No. GB1811395.1 dated Aug. 24, 2018.

International Search Report and Written Opinion dated Mar. 1, 2017, received for International Application No. PCT/IB2016/057542.

Translation of The First Office Action from the State Intellectual Property Office of People's Republic of China for Publication No. 20168007265.2 dated Jul. 29, 2020.

The First Office Action from the State Intellectual Property Office of People's Republic of China for Publication No. 20168007265.2 dated Jul. 29, 2020.

The First Search Report for Chinese Publication No. 20168007265.2 dated Jul. 29, 2020.

Notice of Allowance for Japanese Application No. 2018-525547 dated Sep. 1, 2020.

The State Intellectual Property Office of People's Republic of China, The Second Office Action of Application No. 201680072654.2 dated Apr. 7, 2021.

* cited by examiner

MULTIMEDIA CONTENT PLAYER WITH DIGITAL RIGHTS MANAGEMENT WHILE MAINTAINING PRIVACY OF USERS

BACKGROUND

The present invention generally relates to digital content management systems, and more particularly to digital rights management of content while maintaining privacy of users.

Content owners, such as movie and music studios, require strong assurance against unauthorized copying and usage of licensed content. Examples of licensed content include movies, songs, games and other software applications. User communities often dislike services which use DRM and analytics which give them no choice regarding the collection of their data including personal viewing/listening habits and ability to make personal archive copies of licensed content.

Existing solutions use digital rights management (DRM) with weakly assured player-applications in mobile and smart home devices, such as televisions and tablets. On one hand these existing solutions assure content owners against piracy. While on the other hand these existing solutions provide full knowledge of consumer viewing habits to third party content managers, such as NetFlix, Hulu, Google, and Amazon. All such existing art relies on application integrity tests using manual and basic automated application scanning to assure against "backdoors" which might enable piracy. No existing art provides meaningful privacy for consumers of licensed content.

SUMMARY

Disclosed is a cryptographically assured distributed private cloud, and zero-knowledge assurance that features both content protection and end user privacy. This cryptographic zero-knowledge assures both integrity for content owners and privacy for end users, using cryptocurrency smart contracts. Further, the disclosed system and method enables the creation of an instant video system comparable to NetFlix, Hulu, Google, Amazon, Apple App Store, Google Play and Amazon App Store, which provides both the cryptographic assurance of content control required by content owners to monetize their content free of piracy, and a strong guarantee of privacy for content consumers.

Disclosed is a novel system, computer program product, and method which enables a peer to peer distributed, robustly anonymized market of cloud services, to advertise and make available licensed content for the consumption of end users. The present invention builds upon the services offered by NetFlix, Hulu, Google, Amazon, and others. Services may be advertised into this existing distributed registry which may include the playing of licenses content. Content media player application are checked beforehand using zero knowledge assured computing techniques, such as SCIP, to assure that they will not be executed unmodified from a known acceptable state which does not permit the unauthorized copying of the licensed content or the playing of the content outside agreed parameters in the smart contract.

When a consumer initiates a transaction to play licensed content, the cryptocurrency system executes a smart contract over the chosen cryptocurrency network, such as bitcoin. the smart contract is executed anonymously using enabling art based on Bitcoin and similar cryptocurrencies which include atomic multiparty smart contracts. Upon execution, the smart contract ensures the transfer of an agreed quantity of cryptocurrency based on the value of the desired content; this transaction is ensured to be atomic based on the delivery of the content to the ZK-assured content media player application and the availability and reservation of the appropriate amount of cryptocurrency in the selected account of the consumer.

More specifically, in one example, disclosed is a system, method, and computer readable storage medium for delivering services from a server to ensure multimedia content control by content providers (i.e. reduce piracy) and to ensure privacy by content users. The method begins with executing at least a portion of a content media player application to the device using a zero-knowledge verifiable computing to ensure privacy of the user. Examples of zero-knowledge verifiable computing is succinct computational integrity and privacy (SCIP) protocol, zero-knowledge Succinct non-interactive argument of knowledge (zk-snark) protocol, and probabilistically checkable proof (PCP) protocol. The content media player application includes digital right management technology using zero-knowledge verifiable computing to enforce usage conditions on the multimedia content. A response is received from the user device that the content media player application has executed on the user device. Based upon the response indicating a successful execution, accessing the multimedia content by the content media player application. Otherwise the multimedia content is not accessing the content media player application. Multimedia content is music, video, software, games, or a combination thereof.

In one example, a portion of the content media player application is sent to the one user device using a zero-knowledge verifiable computing to ensure privacy of the user. Also, payment is received from the one user device as payment for a service to electronically deliver the multimedia content over a network to the user system. It can be a cryptocurrency, such as bitcoin.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
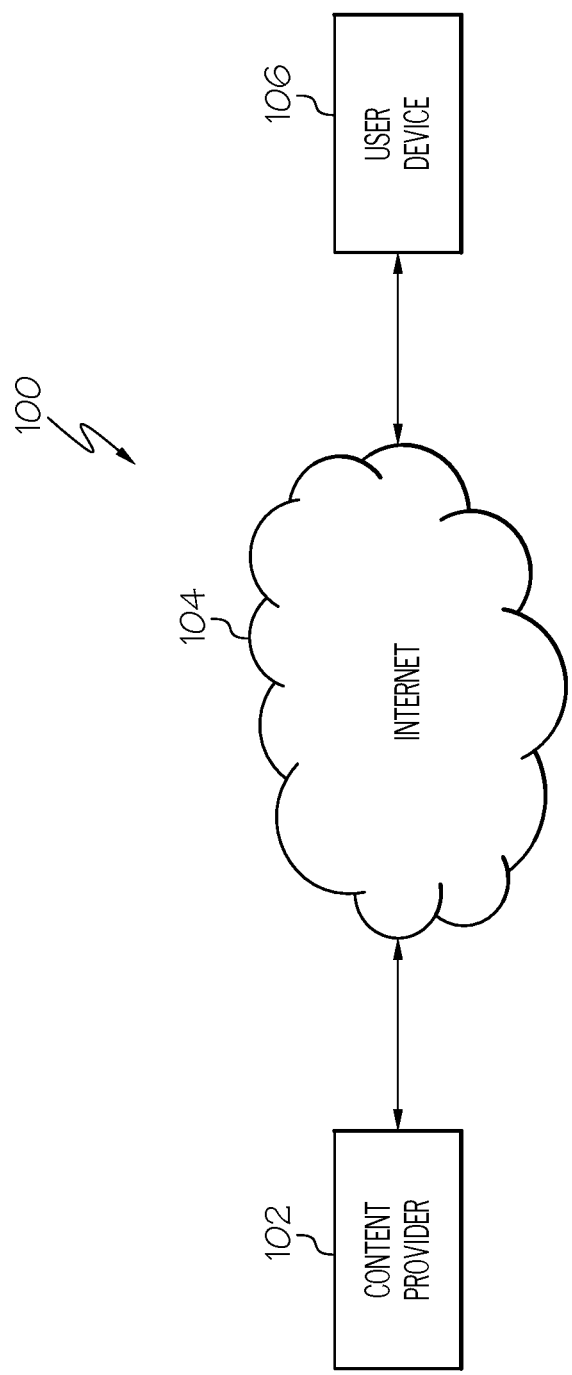
FIG. 1 is a diagram illustrating the dual problem of integrity of content from content providers and users demanding privacy.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention provides both content protection and end user privacy. This is accomplished using cryptographically assured distributed private cloud and zero-knowledge assurance. This cryptographic zero-knowledge assures both content for content owners and privacy for end users, and may be integrated with cryptocurrency smart contracts or optionally using cryptocurrency smart contracts, or similar technologies. Further, the disclosed system and method enables the creation of a system comparable to NetFlix, Hulu, Google, Amazon, and others instant video and other content from online stores, such as the Apple App Store, Google Play and Amazon App Store which provides both the cryptographic assurance of content control required by content owners to monetize their content free of piracy, and a strong guarantee of privacy for content consumers.

NON-LIMITING DEFINITIONS

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "cryptocurrency" is used to mean a medium of exchange using cryptography to secure the transactions and to control the creation of new units. Cryptocurrencies are a subset of alternative currencies, or specifically of digital currencies. Bitcoin is an example.

The term "integrity" or "integrity of content" is used to mean using digital rights management (DRM) systems to guard against piracy and to ensure license conditions are met. The DRM system provides access control to the multimedia content. The access controls typically include one or more of viewing, storing, copying controls, or a combination thereof.

The phrase "verifiable computing" in cryptography, is a method by which one party, the prover, or as used in this patent a "user", can prove to another party, the verifier as used in this patent a "content provider" or "service provider" providing content that a program has been or is being executed correctly and without modification or tampering.

The phrase "zero-knowledge verifiable computing" is a method of verifiable computing which can also function with a zero-knowledge protocol. Examples of zero-knowledge verifiable computing are succinct computational integrity and privacy (SCIP) technique, zero-knowledge succinct non-interactive argument of knowledge (zk-snark) technique, and the zero-knowledge protocol is probabilistically checkable proof (P.C.P.) technique.

A "zero-knowledge protocol", in cryptography, is a method by which one party, the prover, or as used in this patent a "user", can prove to another party, the verifier as used in this patent a "content provider" or "service provider" providing content that a given statement is true, without conveying any information apart from the fact that the statement is indeed true.

Dual Problem of Content Protection and User Privacy

FIG. 1 is a diagram 100 illustrating the dual problem of integrity of content from content providers and users demanding privacy. Shown is a content provider 102 supplying content over a network 104 to a user with a user device 106. In this example, the content provider is Amazon and the end user device is computer or phone. A secure program, such as a digital rights management content media player application, that content provide 102 trusts is to be executed on the end user device 106 to ensure the integrity of the content. That is, the content is protected against copying and other unauthorized uses. The user 106, on the other hand, is nervous about letting any third party code execute on his/her device. There is personal identifiable information on the user device 106, such as, names, contact lists, previous viewing habits, and more that the user does not want to share. However, without giving up the privacy of the user device, the user is willing to execute the program as long as the user can convinced the content provider that the output of the program execution is correct without compromising his/her privacy.

Stated differently, if proving the program being executed on the user device requires knowledge of some secret information on the part of the user, the definition implies that the content provider will not be able to prove the statement in turn to anyone else, since the content provider does not possess the secret information. Notice that the program being proved through execution on the user's device must include the assertion that the user has such knowledge otherwise, the statement would not be proved in zero-knowledge, since at the end of the protocol the content provider would gain the additional information that the user has knowledge of the required secret information. If the statement consists only of the fact that the user possesses the secret information, it is a special case known as zero-knowledge proof of knowledge, and it nicely illustrates the essence of the notion of zero-knowledge proofs: proving that one has knowledge of certain information is trivial if one is allowed to simply reveal that information; the challenge is proving that one has such knowledge without revealing the secret information or anything else.

Cryptographically Assured Multimedia Content Player Application or App Wrapper

A content media player application or a wrapper in which application content can be used is created which allows for the player to perform only the services allowed by the content owner. For example, the permitted services typically are to play the licensed media once or for a specified rental period, or to allow the use of an application with access only to certain data and services once or for a specified time or based on other constraints. This content multimedia player application or wrapper is compiled using SCIP or similar method of cryptographical proof against tampering and screen capture, and the proof of assured execution is recorded. This may be done once, with the proof provided to content owner and end user along with a cryptographic hash of the player/wrapper, both hash and proof of assurance made public on the peer to peer fabric or otherwise. The term wrapper used here means a computer program that works with a preexisting program, such as a preexisting content multimedia player application or game, program, or software utility, to assure execution is recorded. This is contrasted with a separate standalone content multimedia player application.

Alternately or additionally it can be performed at the time of content consumption. The proof together with proof of successful program exit parameters, e.g. play time, number of times played, any in-app content purchased, and more is made available both to the content owner and the consumer to ensure compliance with the terms of the smart contract. On termination or alternately at time of initial stage execution when the player is initiated the smart contract is fulfilled and the cryptocurrency smart contract transaction is completed based on the output of the app and accompanying assurance proof. The cryptocurrency transaction concludes in zero knowledge, providing three-way anonymity/privacy between the consumer, content owner, and automated content broker parties. The smart contract execution is made atomic with the successful exist state of the initial stage or the full player/app in wrapper, such that if the player fails, the cryptocurrency transaction does not complete, and if the cryptocurrency transaction fails, the authorization of the app or player fails.

The result is a consumption of an app or other paid content procured, executed or played, and paid for through cryptocurrency capable of supporting basic two-way and three-way atomic smart contract digital transactions make it cryptographically infeasible to play content without paying, to gain payment without providing the requested service, and for either party to gain information about the other.

Cryptographically Trusted Base Platform

Additionally, it is possible to include in the content media player application parameters and tests to ensure that the content is accessed only on assured workstations, mobile devices, etc., even to specifying maximum display resolution, acceptable device types and number of screens, geography (if a reliable source of this information is available through the executing device) or any other specifications—all the preceding of which can be tested by the content media player application using trusted computing and/or secure boot attestation of the player platform in addition to the content media player application itself. In this case, the content media player application performs a standard trusted computing group-style attestation of the base platform on which the app is to be run and fails to execute if the platform is in an untrusted state. Even more robust assurance against tampering can be provided by the requirement of a device with specific protections against real-time tampering in memory such as those available in Intel SGX or IBM Power ACM or similar architectures.

Content Distribution and Licensing Control

Figure 2:
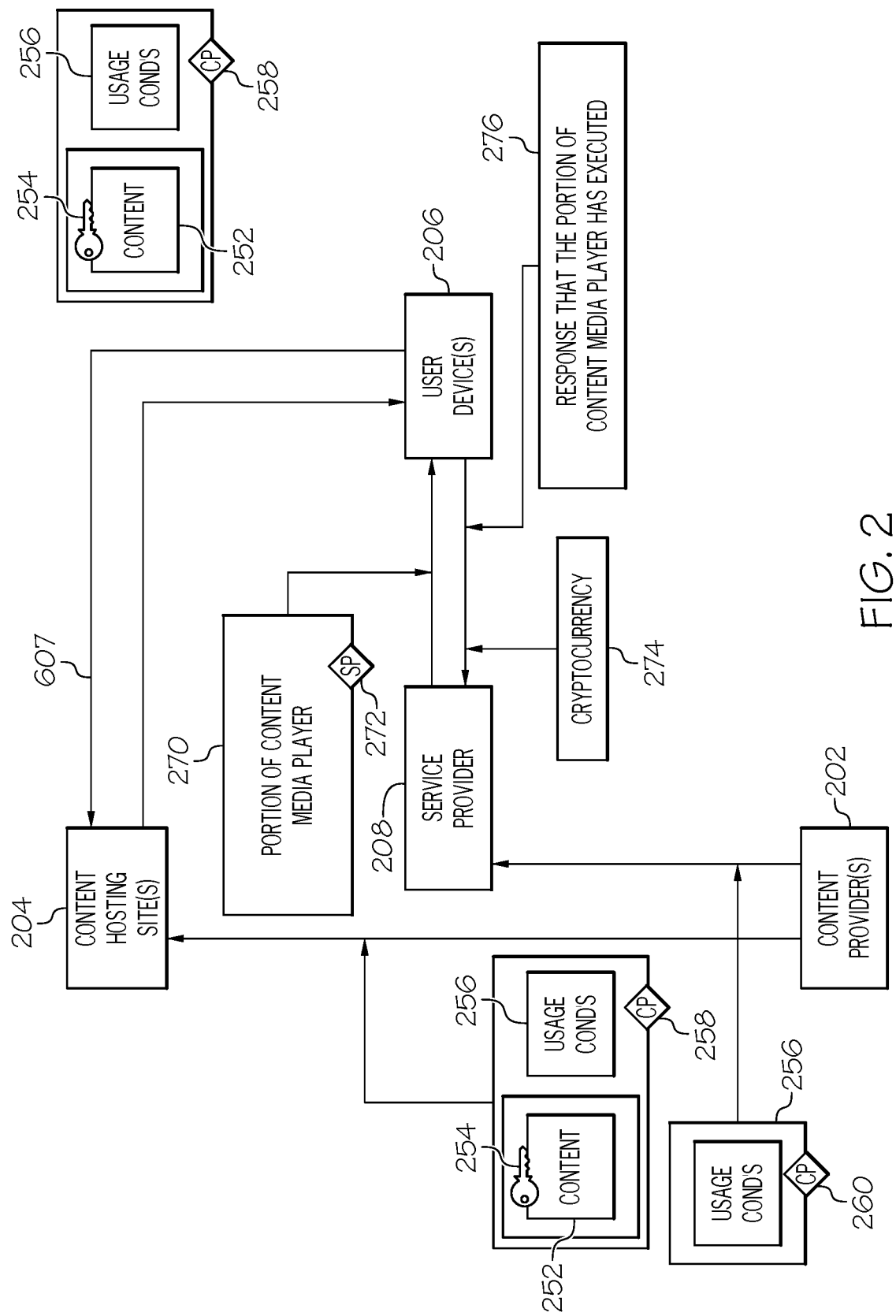
FIG. 2 is a block diagram illustrating an overview of the content distribution and licensing control.

FIG. 2 is a block diagram 200 illustrating an overview of the content distribution and licensing control. In this example, a content provider 202 is a publisher of music, movies or games. The content provider 202, the content hosting sites 204, the service provider 208 and the user device 206 are interconnected a network, such as the internet. It is assumed that the content-purchase commercial transaction between the user device 206 and the service provider 208 is based on standard internet web protocols. As part of the web-based interaction, the user via the user device 206 makes the selection of the content 252 to license or purchase. Typically, in most system the user provides personal and financial information, and agrees to the conditions of purchase. However, in this patent, unlike the prior art systems, the user requires privacy. Payment is received. In one example, an employer wants to preserve content control and the employee wants to watch a how-to-get-help-for-substance-abuse or other private matter video anonymously. In another example, cryptocurrency is used to ensure the user's privacy. Cryptocurrency, such as bitcoin, may be used. The service provider 208 could obtain payment authorization as a peer-to-peer transaction from the user device 206 without use of an intermediary bank using a public payment ledger. The user-device 206 can include, for example, information processing systems such as desktop computers, laptop computers, servers, wireless devices (e.g., mobile phones, tablets, personal digital assistants, etc.), and the like.

It is also assumed in FIG. 2 that the service provider 208 made available for downloaded at least a portion of a content media player application to a user device 206 based on standard web protocols. The content media player application 206 may also be signed 272 by the service provider. The architecture requires that the service provider 208 receives an assurance 276 from the content media player application that it has successfully executed on the user device 206. In one embodiment, it may assign a unique application ID to the downloaded Content media player application and that the user device 206 stores it for later application license verification.

The overall licensing flow starts at the content provider 202. The content provider 202 encrypts the content 252 using an encryption key locally generated. In an alternate embodiment, the key instead of being locally generated may be sent to the content provider 202 from the third party, such as a clearinghouse (not shown). The content provider 202 encrypts the content 252 to create encrypted content 254 with usage conditions 256. The content 252 object may part of a streaming service or the entire content delivered at one, such as a game. The content provider 202 may sign 258 the encrypted content 254.

In one example, the content provider 202 distributes the encrypted content 254 with usage conditions 256 to one or more service provider 208 cause the content hosing site 204 (if the service provider is not hosting their own content, as is the case with Netflix) to send the encrypted content 254 with usage conditions 256 to the user device 206 once the assurance 276 that the content media player application that it has successfully executed.

After the completion of the content-purchase transaction between the user device 206 and the service provider 208, the service provider 208 creates and transfers to the user device 206. After receiving the encrypted content 254 with usage conditions 256, user device using the portion of the content media player 270 decrypts the encrypted content 254.

Flow Diagram Distribution and Licensing Control

Figure 3:
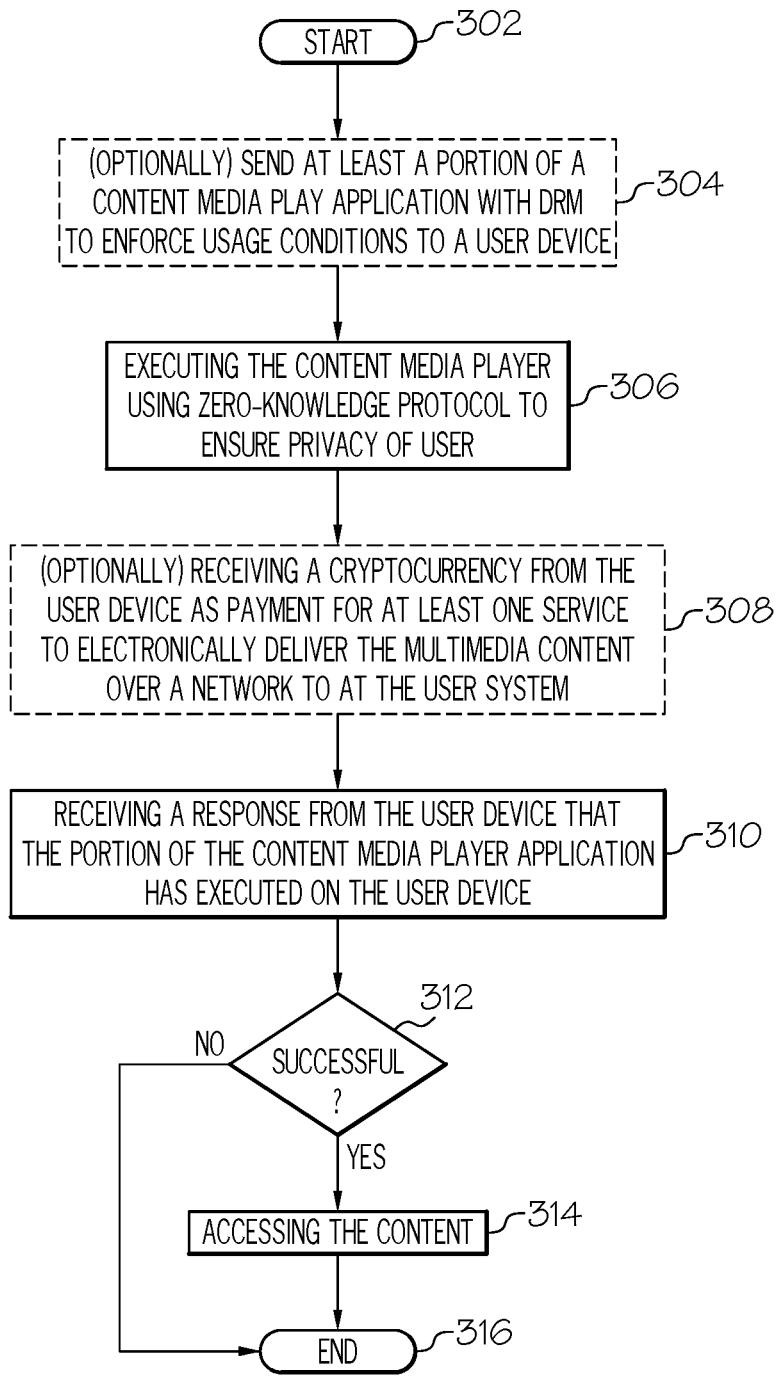
FIG. 3 is a flow diagram illustrating multimedia content control by content providers and to ensure privacy by content users.

FIG. 3 is a flow diagram 300 illustrating multimedia content control by content providers and to ensure privacy by content users. The process begins at step 302 and immediately proceeds to an optional step 302 in which at least a portion of the content media player application 270 with DRM may be sent from the service provider 208 to the user device 206. The content media player 270 is executed on the user device 206 using zero-knowledge protocol to ensure the privacy of the user. The process continues to another optional step 308 in which the service provider 208 receives cryptocurrency from the user device 206. This is as consideration or payment for the content 254. The service provider 208 receives a response from the user device that the content media application has executed in step 310. In response to the execution being successful 312, accessing the encrypted content 254 and usage conditions 256 by the user device 206 to be decrypted and played in step 314, and the process ends in step 316. In the case the execution not being successful in step 312, the process ends in step 316.

Generalized Computing Environment

Figure 4:
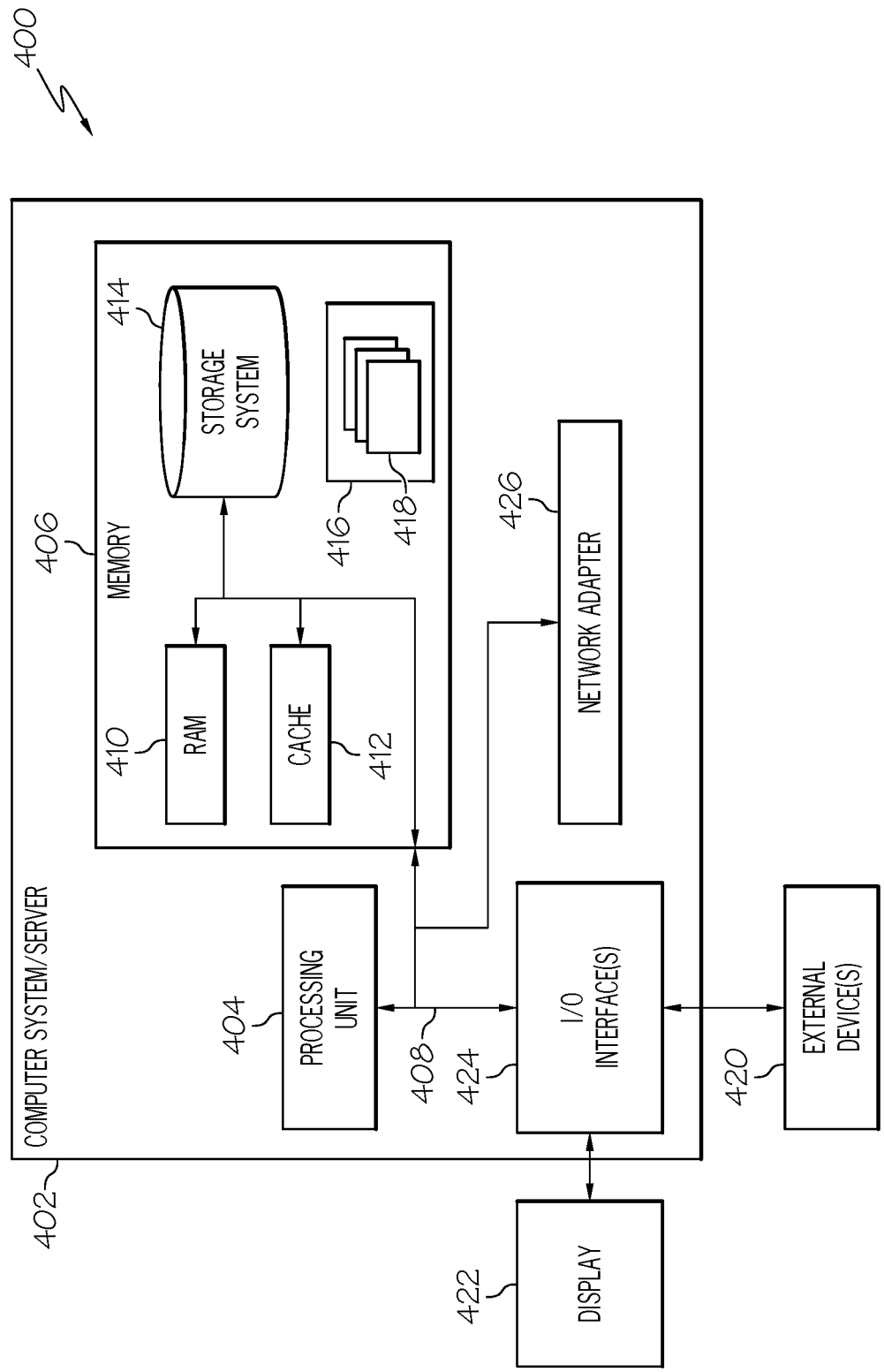
FIG. 4 illustrates one example of a server computing node according to one example of the present invention.

FIG. 4 illustrates one example of a processing node 400 for operating the content provider 202, the content host 204, and the service provider 208 and is not intended to suggest any limitation as to the scope of use or functionality of embodiments of the invention described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types.

Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406, in one embodiment, implements the block diagram of FIG. 2 and the flow chart of FIG. 3. The system memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of various embodiments of the invention.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 402 may also communicate with one or more external devices 1020 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Cloud Computer Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
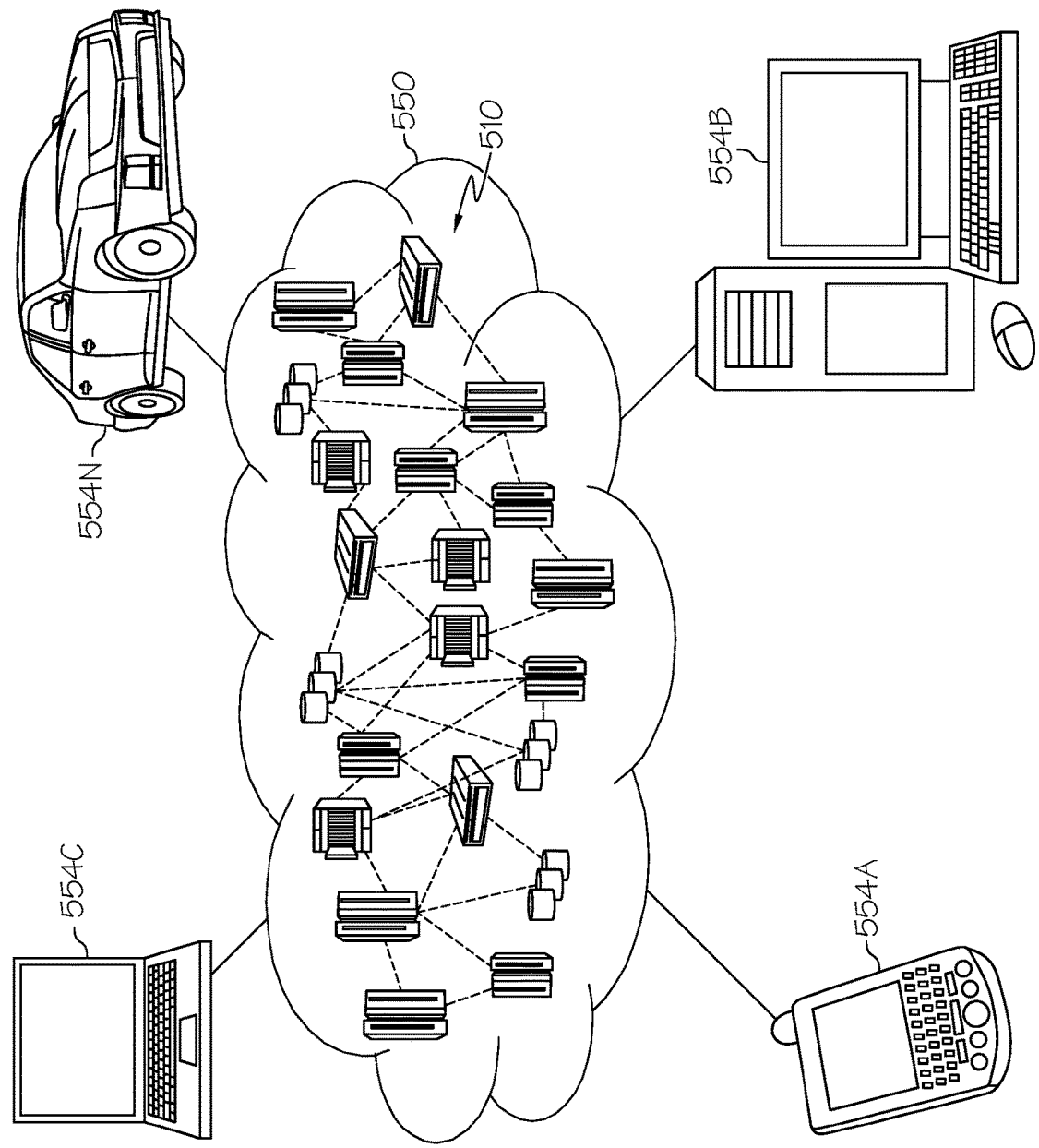
FIG. 5 depicts a cloud computing environment according to an embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
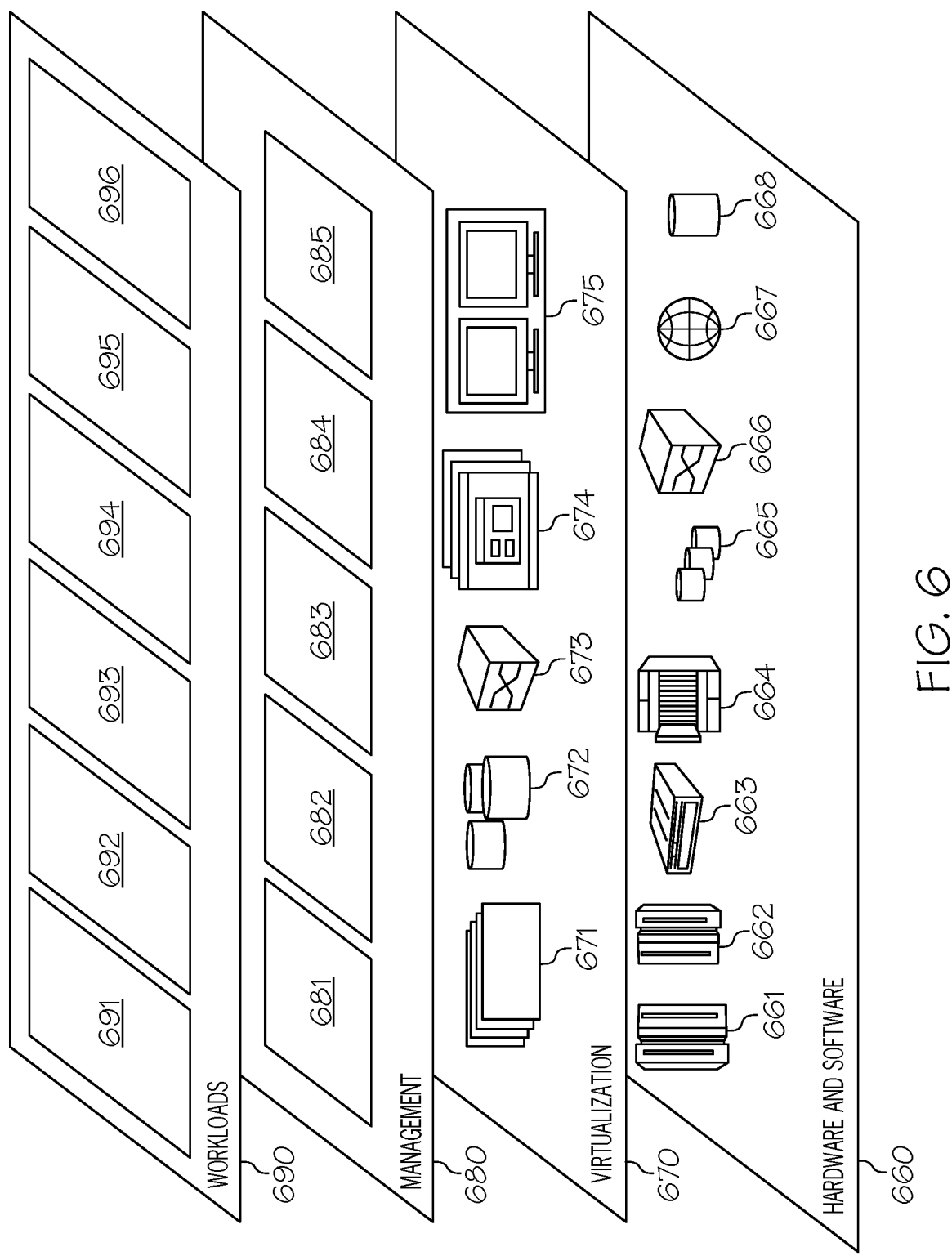
FIG. 6 depicts abstraction model layers according to an embodiment of the present invention.

Referring now to FIG. 6, a set of functional abstraction layers provided by cloud computing environment 550 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and for delivering services from a server to ensure multimedia content control by content providers (i.e. reduce piracy) and to ensure privacy by content users 696.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method on a user device for delivering services from a server to ensure multimedia content control by a content provider and to ensure privacy by a user, the method comprising:
    executing, on at least one user device, at least a portion of a content media player application using a zero-knowledge protocol that generates a zero-knowledge proof verifying that the content media player application successfully executed, without conveying any information apart from a fact that the content media player successfully executed thereby maintaining privacy of the user;
    receiving, by the at least one user device from a server, usage conditions on the multimedia content with the content media player application including digital rights management technology;
    generating, on the at least one user device, a secure boot attestation to verify a state of the at least one user device that the media player application is running;
    attesting, by the at least one user device an attestation of the verified state of the at least one user device that the media player application is running;
    sending, by the at least one user device to the server, an attestation response from the at least one user device including the zero-knowledge proof;
    accessing the multimedia content using the content media player application on the at least one user device in response to and the secure boot attestation indicating successful execution of the portion of the content media player application;
    generating, on the at least one user device, a proof of successful program exit parameters; and
    sending, by the at least one user device to the server, the zero-knowledge proof with the proof of successful program exit parameters.

2. The computer-based method of claim 1, further including:
    receiving, by the at least one user device from the server, at least a portion of the content media player application using the zero-knowledge protocol to ensure privacy of the user.

3. The computer-based method of claim 1, further including:
    sending, by the at least one user device to the server, a payment.

4. The computer-based method of claim 3, wherein the receiving the payment further includes receiving a cryptocurrency as payment.

5. The computer-based method of claim 1, wherein the zero-knowledge verifiable computing executes in a trusted execution environment.

6. The computer-based method of claim 1, wherein the zero-knowledge verifiable computing is zero-knowledge Succinct non-interactive argument of knowledge (zk-snark) technique.

7. The computer-based method of claim 1, wherein the zero-knowledge verifiable computing is probabilistically checkable proof (P.C.P.) technique.

8. The computer-based method of claim 1, wherein the content media player application reports usage information of the multimedia content without reporting personally identifiable information of the user device.

9. The computer-based method of claim 1, wherein the multimedia content is at least one of music, video, software, games, or a combination thereof.

10. The computer-based method of claim 1, wherein the portion of the content media player application is a wrapper application that enforces digital rights management onto a preexisting application or web browser on the user device.

11. The computer-based method of claim 4, wherein the receiving the cryptocurrency from the at least one user device is payment for the multimedia content and is used to form an anonymous contract for electronically delivering the multimedia content over a network to the at least one user device.

12. The computer-based method of claim 4, wherein the receiving a cryptocurrency from the at least one user device includes receiving a Bitcoin payment.

13. A user system for delivering services from a server to ensure multimedia content control by a content provider and to ensure privacy by a user, the system comprising:
a memory;
a processor communicatively coupled to the memory, where the processor is configured to perform
executing, on at least one user device, at least a portion of a content media player application using a zero-knowledge protocol that generates a zero-knowledge proof verifying that the content media player application successfully executed, without conveying any information apart from a fact that the content media player successfully executed thereby maintaining privacy of the user;
receiving, by the at least one user device from a server, usage conditions on the multimedia content with the content media player application including digital rights management technology;
generating, on the at least one user device, a secure boot attestation to verify a state of the at least one user device that the media player application is running;
attesting, by the at least one user device an attestation of the verified state of the at least one user device that the media player application is running;
sending, by the at least one user device to the server, an attestation response from the at least one user device including the zero-knowledge proof;
accessing the multimedia content using the content media player application on the at least one user device in response to and the secure boot attestation indicating successful execution of the portion of the content media player application;
generating, on the at least one user device, a proof of successful program exit parameters; and
sending, by the at least one user device to the server, the zero-knowledge proof with proof of successful program exit parameters.

14. The system of claim 13, further including:
receiving, by the at least one user device from the server, at least a portion of the content media player application to the at least one user device using the zero-knowledge protocol to ensure privacy of the user.

15. The system of claim 13, further including:
sending, by the at least one user device to the server, a payment for at least one service to electronically deliver the multimedia content over a network to at least one user system.

16. The system of claim 15, wherein the receiving the payment further includes receiving a cryptocurrency as payment.

17. The system of claim 13, wherein the zero-knowledge protocol is succinct computational integrity and privacy (SCIP) technique.

18. A non-transitory computer program product on a user device for delivering services from a server to ensure multimedia content control by a content provider and to ensure privacy by a user comprising a computer readable storage medium having computer readable program code embodied therewith, the computer readable program code configured to perform:
executing, on at least one user device, at least a portion of a content media player application using a zero-knowledge protocol that generates a zero-knowledge proof verifying that the content media player application successfully executed, without conveying any information apart from a fact that the content media player successfully executed thereby maintaining privacy of the user;
receiving, by the at least one user device from a server, usage conditions on the multimedia content with the content media player application including digital rights management technology;
generating, on the at least one user device, a secure boot attestation to verify a state of the at least one user device that the media player application is running;
attesting, by the at least one user device an attestation of the verified state of the at least one user device that the media player application is running;
sending, by the at least one user device to the server, an attestation response from the at least one user device including the zero-knowledge proof;
accessing the multimedia content using the content media player application on the at least one user device in response to and the secure boot attestation indicating successful execution of the portion of the content media player application;
generating, on the at least one user device, a proof of successful program exit parameters; and
sending, by the at least one user device to the server, the zero-knowledge proof with proof of successful program exit parameters.

19. The non-transitory computer program product of claim 18, further including:
receiving, by the at least one user device from the server, at least a portion of the content media player application to the at least one user device using the zero-knowledge protocol to ensure privacy of the user.

* * * * *